United States Patent
Ladden et al.

Patent Number: 5,873,035
Date of Patent: Feb. 16, 1999

[54] CONDUCTING HANDOFF OF A DATA TRANSMISSION

[75] Inventors: Gregory C. Ladden, Vernon Hills, Ill.; Joe Rosswog, Huntsville, Ala.; Jay Jayapaplan, Buffalo Grove, Ill.

[73] Assignee: Motorola, Inc., Schaumburg, Ill.

[21] Appl. No.: 594,081

[22] Filed: Jan. 30, 1996

[51] Int. Cl.⁶ .................................................. H04Q 7/22
[52] U.S. Cl. .......................................... 455/436; 370/320
[58] Field of Search .......................... 455/91, 436, 463; 358/468, 434, 435, 436; 370/397, 345, 423, 207, 342, 433, 398, 335, 337, 395; 371/32

[56] References Cited

U.S. PATENT DOCUMENTS 5,195,091  3/1993  Farwell et al. .
5,491,565  2/1996  Naper .
5,590,133  12/1996  Billstrom et al. .
5,603,081  2/1997  Raith et al. .
5,608,722  3/1997  Miller ..................................... 370/320

Primary Examiner—William Cumming
Attorney, Agent, or Firm—Kenneth A. Haas

[57] ABSTRACT

During a wireless communication of data in which modems (21, 24) are in use, a method of handing off the communication link (32) is described. The communication link (32) is handed off from a source base site (22) to a target base site (23). An interworking function (33) is then transfered from a source interworking unit (25) to a target interworking unit (26) by transferring protocol status (42) such as transmission control protocol. A cut over (34) from the source modem (21) to a target modem (24) is conducted once the interworking function (33) is transfered.

10 Claims, 5 Drawing Sheets

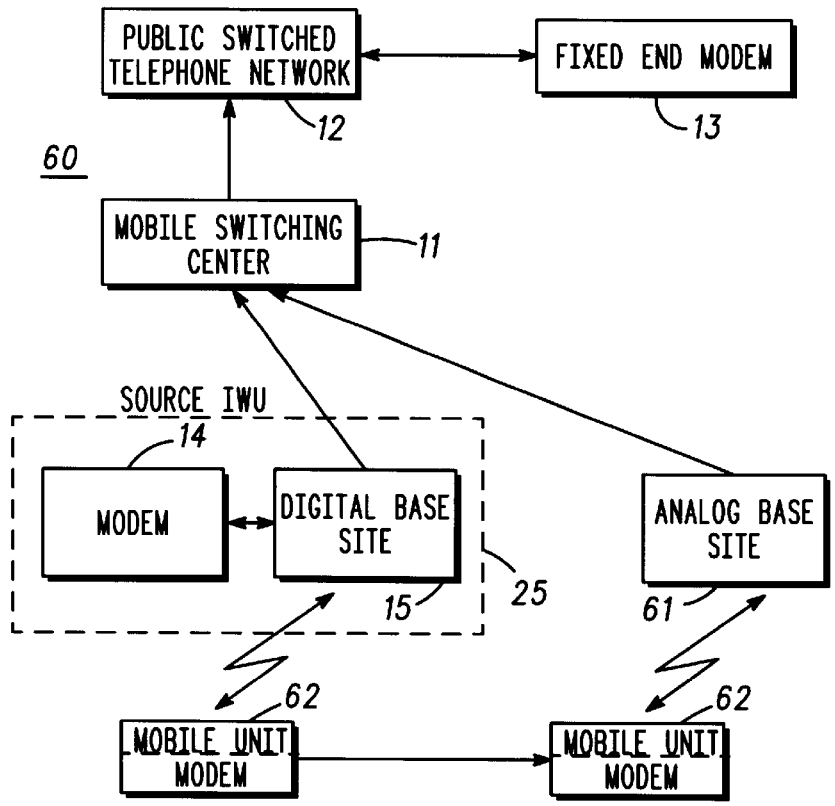
*FIG.6*
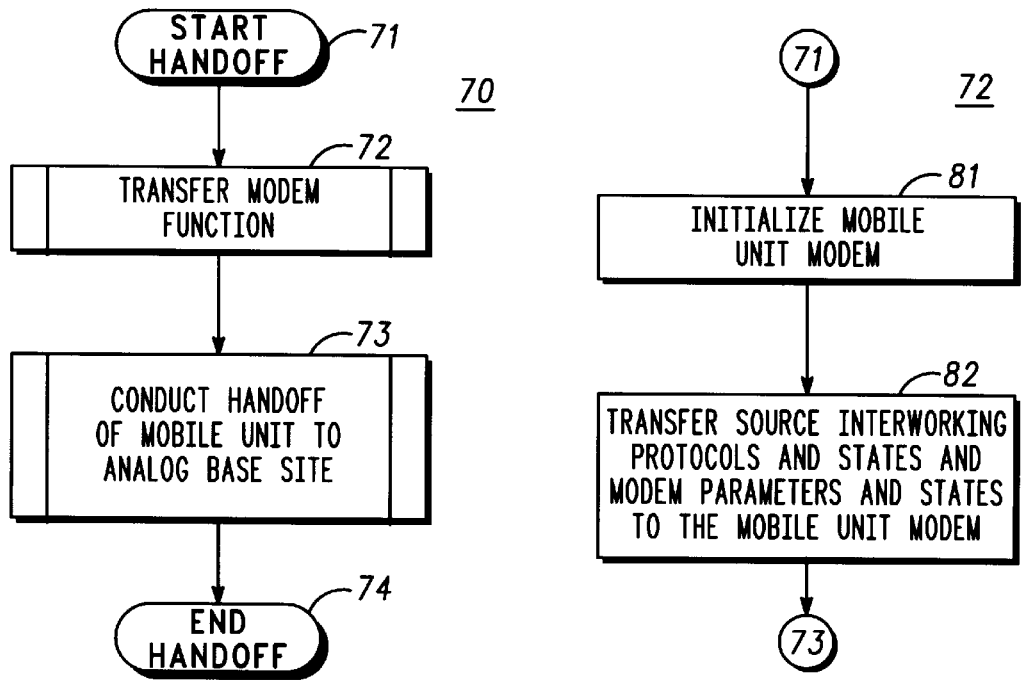
*FIG.7*  *FIG.8*

# CONDUCTING HANDOFF OF A DATA TRANSMISSION

FIELD OF THE INVENTION

The present invention relates, in general, to communication systems, and more particularly, to conducting handoff of a data transmission in a communication system.

BACKGROUND OF THE INVENTION

A block diagram of a prior art system is shown in FIG. 1. In normal operation, a mobile 18 establishes a call using an anchor base station 15 and a mobile switching center 11. Base station 15, which established the call first, is designated the anchor base station as it provides the links necessary during the entire call for connecting the call to the Public Switched Telephone Network (PSTN) 12. Anchor base station 15 utilizes a modem 14 from a bank of modems. Modem 14 is designated the anchor modem for this call. At the beginning of the call anchor modem 14 "handshakes" with a fixed end modem 13 to establish the modem protocols and bit rates to be used. This "handshake" is required since each time a modem-to-modem connection is made via switched circuits, the path, and therefore the characteristics of the communication channel provided by that path, are different. Therefore, the modems train themselves and will adapt to the channel by selecting various parameter values that match the channel.

When mobile 18 moves out of the coverage area of anchor base station 15, it is handed-off to target base station 16. Even if target base station 16 has its own pool of modems 17, existing systems will continue to use anchor modem 14 for the entire call. This ensures that the parameter values chosen for communication with fixed end modem 13 remain the same; allowing data communication to continue after a hand-off without any additional modem training. Under this prior design, target base station 16 expects MSC 11 to provide a connection to anchor modem 14 through anchor base station 15. This method will require links between MSC 11 and anchor base station 15 as well as links from target base station 16 to MSC 11. Therefore, there is a need in the industry to provide a means of coupling modems that does not require the use of two base station resources in order to maintain the connection.

BRIEF DESCRIPTION OF THE DRAWINGS

FIG. 6 is a block diagram of a second system implementing the present invention;

FIGS. 7 and 8 are flow charts of a second process embodying the present invention;

DETAILED DESCRIPTION OF THE DRAWINGS

Figure 1:
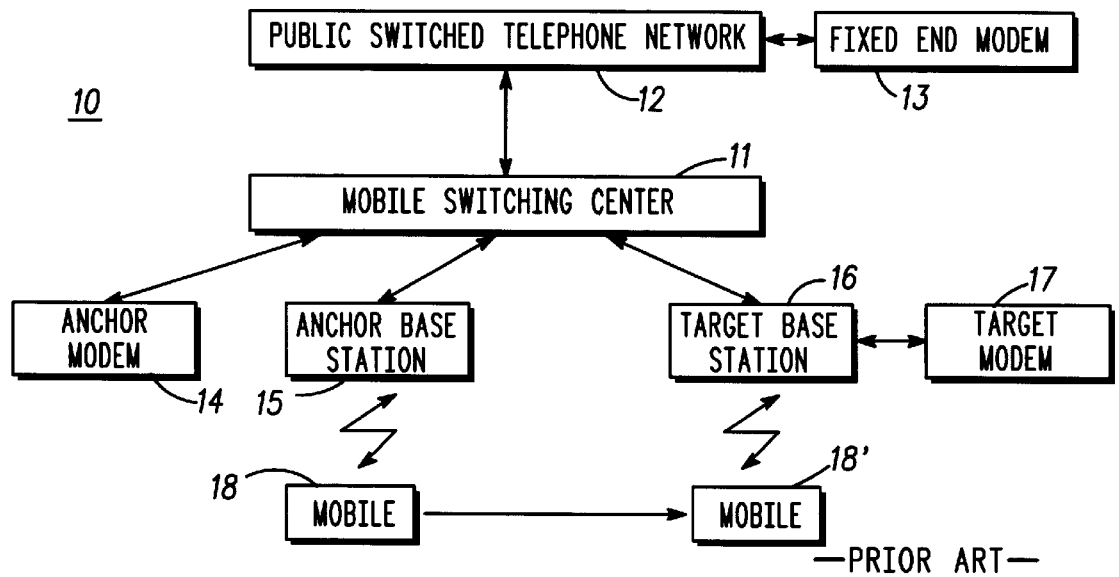
FIG. 1 is a block diagram of a prior art system.
Figure 2:
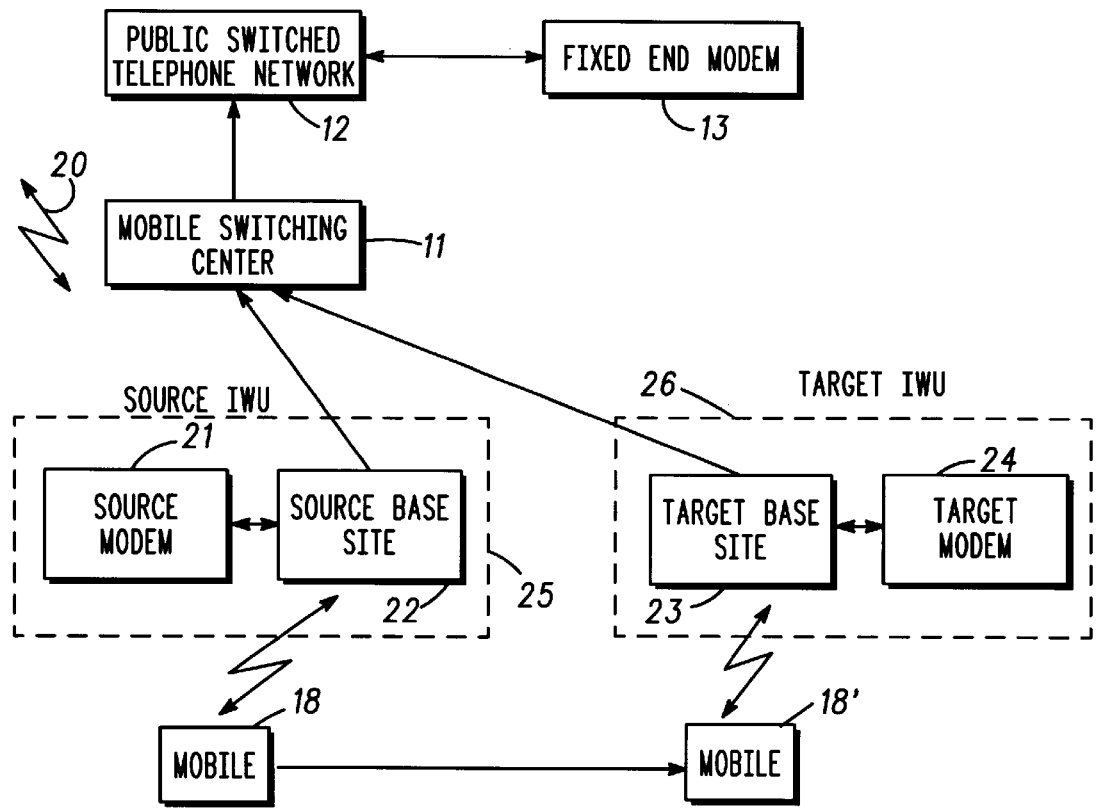
FIG. 2 is a block diagram of a system implementing the present invention.

Referring now to FIG. 2, a block of a communication system, generally designated 20, capable of implementing the present invention is illustrated. In this embodiment, the cellular system provides hand-off from a Source InterWorking Unit (IWU) 25 to a Target IWU 26. The IWU provides the infrastructure termination point for the cellular air interface data protocols and also includes the PSTN compatible Modems (i.e., Source and Target IWU Modems 21 and 24 respectively). The PSTN fixed end modem 13 is used for asynchronous data and Group 3 Facsimile data transmissions to compatible fixed end or land-based data communication equipment. The connection between Mobile 18 and Source Base Site 22 represents a data call in-progress to Fixed End Modem 13. The data path consists of source IWU 25, MSC 11, and PSTN 12. When mobile 18 moves to a new serving area, covered by Target IWU 26, the configuration parameters and protocol states from Source Modem 21 are moved to Target Modem 24. The transfer of modem parameters from Source Modem 21 to Target Modem 24 enables the cellular system to successfully transfer an in-progress data call from Source IWU 25 to Target IWU 26.

Before hand-off, Source Base Site 22 provides the path for the Mobile 18 to reach Source Modem 21. After hand-off, Target Base Site 23 provides the path for the Mobile 18 to reach the Target Modem 24.

Figures 3, 4, 5:
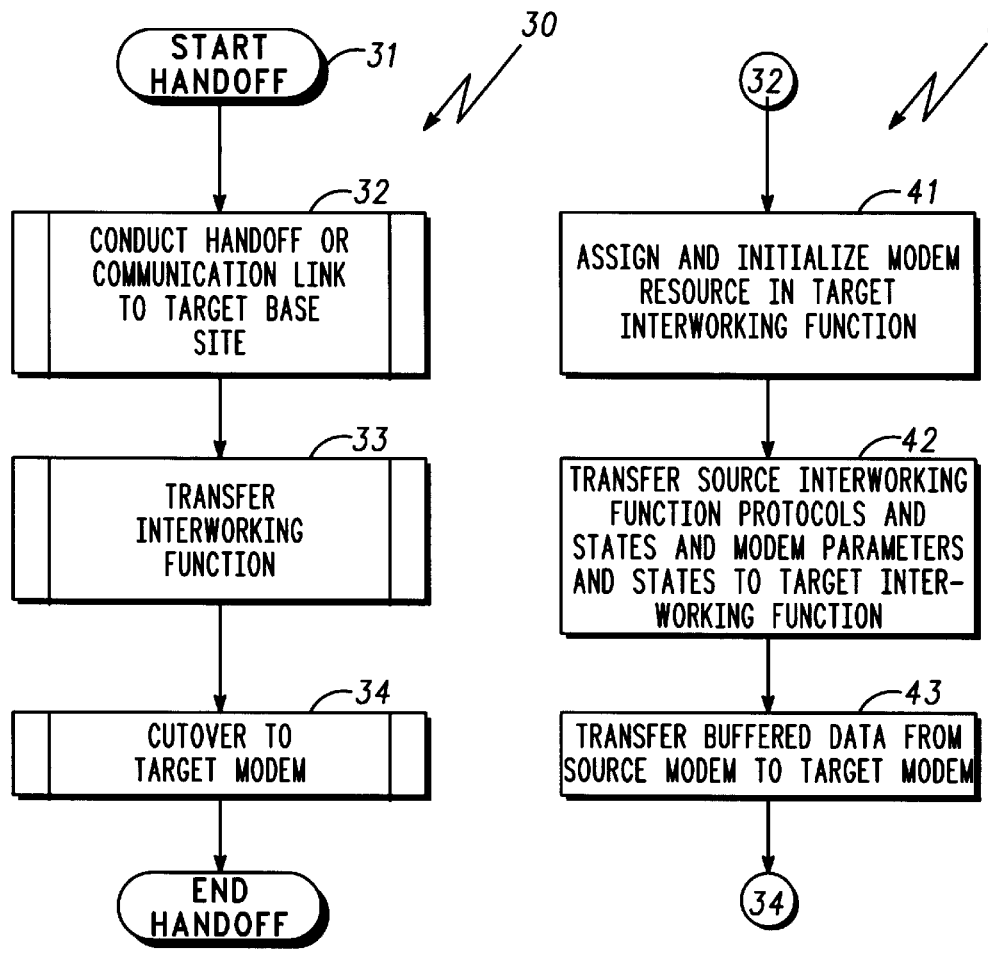
FIGS. 3–5 are flow charts of a process embodying the present invention.

Referring now to FIGS. 3–5, flow charts of a process embodying the present invention are illustrated. In FIG. 3, a general process 30 is illustrated. Process 30 consists of a start step 31 when it is determined that a hand-off is desired. Next, in subprocess 32, the mobile 18 is handed to target base site 23 by handing-off the communication link. This is followed by the transfer of interworking unit in subprocess 33. Finally, the processing by source modem 21 is cutover to target modem 24.

Subprocess 32 is conducted as previously where mobile 18 registers on with target base site 23 while still attached to source base site 22. This will also establish the physical path from target base site 23 to MSC 11, although the user data is not yet re-directed.

In subprocess 33, the Source IWU 25 and Source Modem 21 parameters are transferred to Target IWU 26 and Target modem 24, respectively. The cellular system enters the subprocess 33 in order to prepare Target IWU 26 for the hand-off. A more detailed description of subprocess 33 is provided in FIG. 4. In step 41, target modem 24 is assigned to the call and is initialized. Next, in step 42, the source interworking function protocols and status and the modem parameters and states are transferred to the target interworking unit and target modem. This creates a duplicate configuration of source modem 21. The protocol status, or a parameter of the protocol status, transfered may comprise one or more of a transmission control protocol, an internet protocol, a point-to-point protocol, a radio link protocol, a connectionless networking protocol, a transport protocol, a Universal Data Protocol (UDP), the CCITT (International Telegraph & Telephone Consultative Committee) V.42 protocol, an error control protocol, or a data compression protocol. The modem parameters may comprise one or more of an equalization parameter, an echo canceler parameter, an originate/answer state parameter, an ATtention (AT) command set-up parameter, a modem speed parameter, or a modem receive level parameter.

Finally, in step 43, any buffered data in source modem 21 is transferred to target modem 24. This ensures that any acknowledged data by the interworking unit protocols is not lost.

At this point, target IWU 26 is ready to take over for the source IWU 25 and the cutover, subprocess 34, to target modem 24 is made. This subprocess is illustrated in more detail in FIG. 5. FIG. 5 illustrates the last stage in the hand-off from the source modem 21 to target modem 24. In step 51, source modem 21 is disconnected from PSTN 12 so that there will be only one modem, target modem 24, coupled to fixed-end modem 13.

Next, in step 52, a new link to the PSTN from target modem 24 is created. This PSTN connection is made immediately following the tear-down of the source modem's PSTN connection. All of the above process is completed in less time than a fixed-end modem will take to determine loss-of-carrier and disconnect from the PSTN. Once the cutover is performed, source IWU 25 is no longer in the path and may be deallocated. Deallocating in this instance consists of deallocating the source interworking function trunks and modem resources (step 53).

Referring now to FIG. 6, a second system 60 capable of implementing the present invention is illustrated. In system 60, a mobile unit 62, having a modem therein, being serviced by a digital source IWU 25 (having a digital base site 15) is being handed off to an analog base site 61. While mobile unit 62 is being serviced by digital source IWU 25, mobile 62 sends the user data digitally over the air interface. No analog representation of the data is necessary as ordinarily done in voice band modems over telephone lines. Analog base station 61, however, expects to receive voice band signals. Therefore mobile 62 moving into an analog service area from the digital service area has to employ a voice band modem to continue the call. Such transition requires that the modulation and demodulation of voice band signals shift from the source IWU 25 to a modem at mobile 62. It is considered impractical to hand-off a data call from the digital cellular service area to the analog service area as this requires that fixed end modem 13, which is communicating with the modem 14, should, after hand-off, break the link and establish a link with the modem in mobile unit 62. Modems are generally not designed to disconnect with the fixed end in the middle of a call and train and establish a link with another distant modem. This invention makes it possible by keeping the fixed end modem oblivious to such change.

In FIG. 7, a method, generally represented by flow chart 70, of performing this handoff in a communication system 60 is described. By prior art methods, the system decides to hand-off mobile unit 62 to analog base site 61. This initial step is represented by step 71. In subprocess 72 the modem functions are transfered from source IWU modem 14 to a voice band modem in mobile 62. These functions may be transfered using either a traffic channel link or a control channel link. The next step 73 comprises of events that notify the mobile to switch to the new traffic channel which, in this case, would be an analog channel. The hand-off process completion is denoted by step 74.

Subprocess 72 is demonstrated in more detail in FIG. 8. The modem of mobile unit 62 is first initialized, step 81. Following initialization, the parameter and state information of source IWU 14, as received from the system by the mobile, is loaded into the modem at mobile unit 62 (step 82). The modem in mobile 62 then communicates with fixed end modem 13 through analog base site 61, MSC 11, and PSTN 12—bypassing source IWU 25.

Figure 9:
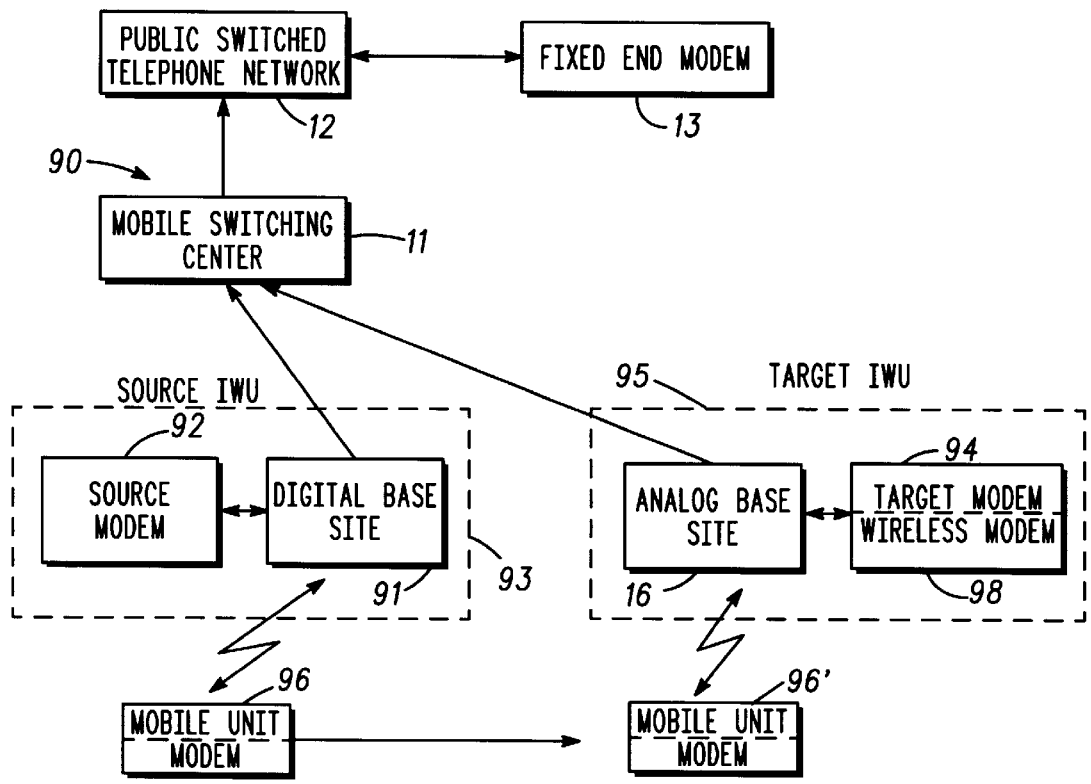
FIG. 9 is a block diagram of a third system implementing the present invention.

Referring now to FIG. 9, a block diagram of a third communication system, generally designated 90, capable of implementing the present invention is illustrated. In system 90, mobile unit 96 moves from an in-progress data call over a digital air interface with a digital base site 91, such as a CDMA base site, and moves to an analog base site 16. After hand-off, a wireless modem of mobile 96 communicates with a wireless modem 98; and a target modem 94 works with fixed end modem 13.

Source IWU 93 has one source modem 92 in use per call as shown, while target IWU 95 uses two target modems 94. Target IWU 95 has two modems in use per call so that mobile 96 can use a wireless modem optimized for cellular use, while target modem 94 maintains compatibility with fixed end modem 13.

When mobile 96 moves from source IWU 93 to target IWU 95, the source modem parameters from source modem 92 are transferred to target modem 94. This transfer mechanism will allow a data hand-off from a digital cellular system to an analog cellular system by making the transfer in less time than fixed end modem 13 needs to detect loss-of-carrier. Target modem 94 can maintain the link integrity to fixed end modem 13 while mobile 96 is disconnecting from the digital system and reconnecting to the analog system using its wireless modem.

Figure 10:
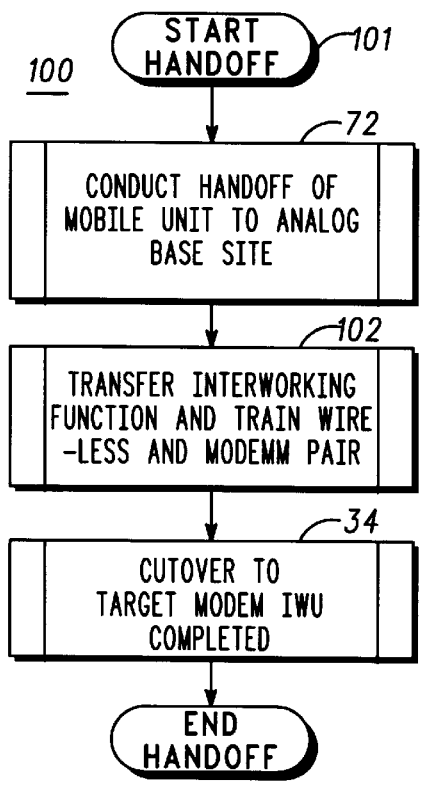
FIGS. 10 and 11 are flow charts of a third process embodying the present invention.
Figure 11:
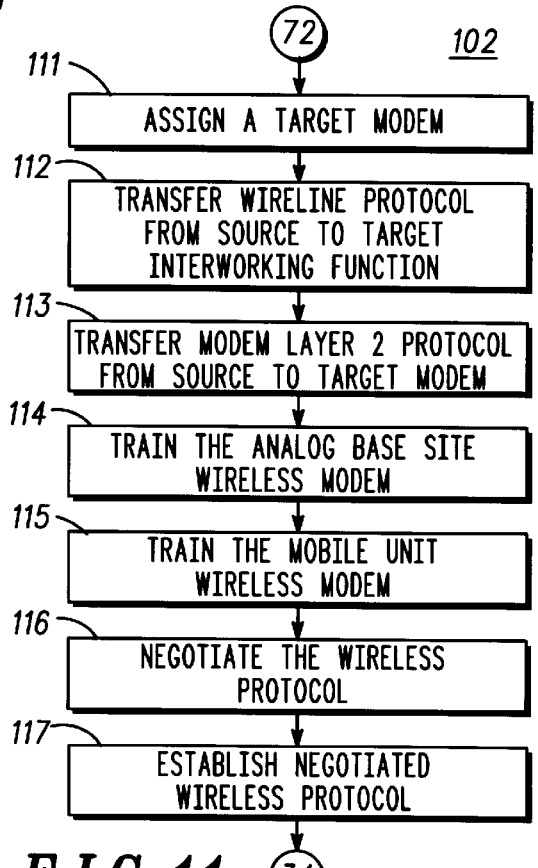

The process by which system 90 operates is illustrated in the flow charts of FIGS. 10 and 11. In FIG. 10, a process, generally designated 100, of handing off a communicatin link is illustrated. The first step in process 100 is the determination that a handoff is needed, step 101. A handoff of mobile unit 96 to analog base site 16 is then conducted as described in subprocess 72, described in more detail in the discussion of FIG. 8. Next, the interworking function is transferred and the wireless modem pair is trained, subprocess 102. This subprocess 102 will be described in more detail in FIG. 11, below. Once the wireless modems have established a connection, the cutover to target IWU 95 is completed, subprocess 34 which is described in more detail in the discussion of FIG. 5.

FIG. 11 shows further detail of subprocess 102. First, a target modem 94 is assigned by target IWU 95 to handle the connection, step 111. The wireline protocol is then transferred from source IWU 93 to target IWU 95, step 112. In order to maintain the link to fixed end modem 13, the modem layer 2 protocol, such as V.42, state is first transferred to target modem and target modem 94 is coupled to fixed end modem 13, step 113. Other wireline protocols transfered consist of the error control protocol and the data compression protocol.

In steps 114 and 115, the analog base site wireless modem 98 and the mobile units wireless modem are trained. The two wireless modems then negotiate the wireless protocol to be used, step 116; and establish the negotiated wireless protocol, step 117. Subprocess 102 then returns to subprocess 34 of FIG. 11.

Figure 12:
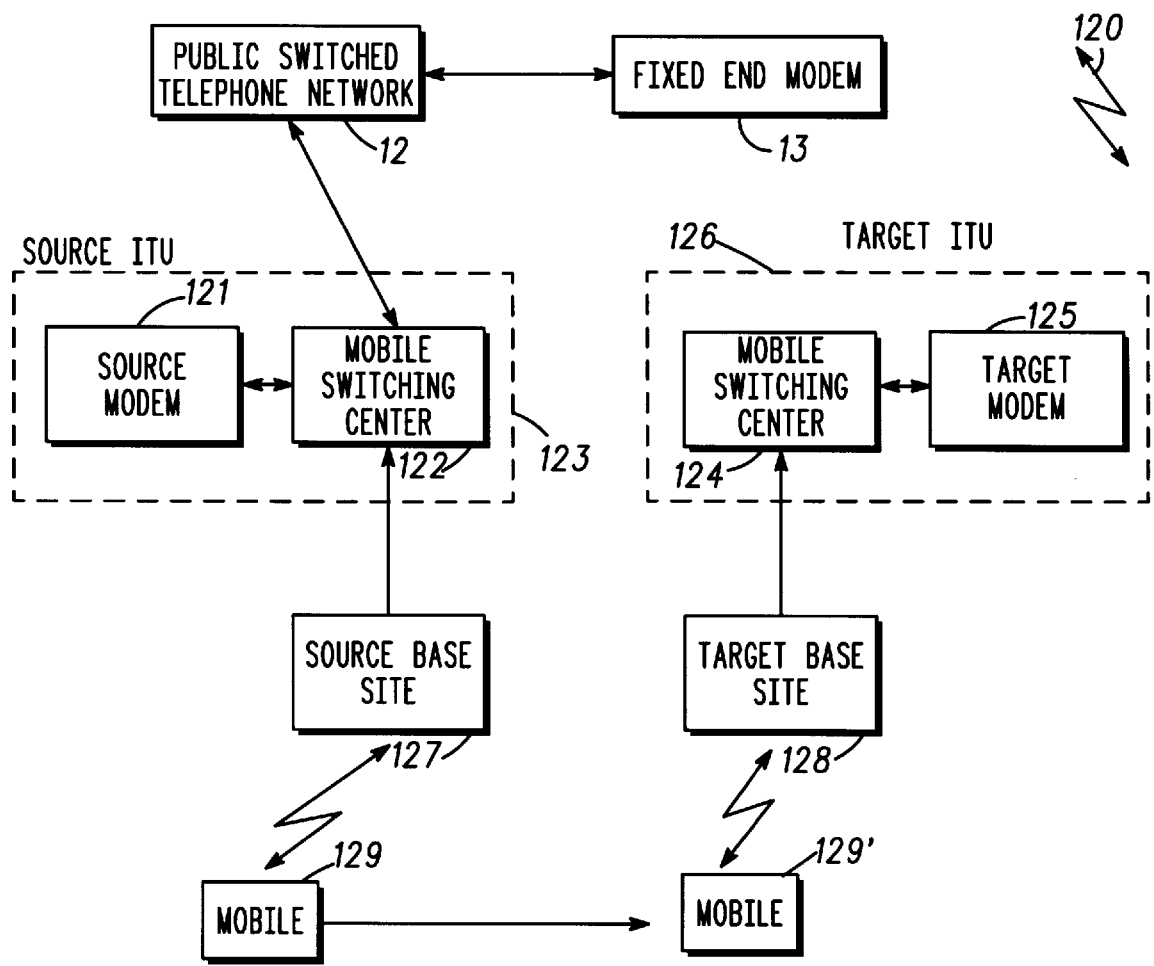
FIG. 12 is a block diagram of a fourth system implementing the present invention.

Referring now to FIG. 12, a fourth system, generally designated 120, capable of implementing the present invention is illustrated. System 120 illustrates the connections required when a handoff is conducted from a base site 127 being coupled to a first mobile switch center 122 is handed off to a second mobile switch center 124. As illustrated, mobile switch center 122 and source modem 121 make up the source IWU 123. A mobile 129 in communication with source base site 127 uses source modem 121 to communicate with fixed end modem 13. When mobile 129 moves to 129' where a handoff is to be conducted to target base site 128, one of the above processes is executed. This transfers the parameters and protocol states of source modem 121 to target modem 125 prior to the completion of the handoff. Mobile 129' is then in communication with fixed end modem 13 by way of target modem 125. Modem 125 is coupled to fixed end modem 13 by means of MSC 124, MSC 122, and PSTN 12. Source modem 121 is no longer used following handoff.

Therefore, a method and system design for conducting handoff in a communication system has been demonstrated which eliminates the need for the anchor base station required by the prior art and reduces the load on the system. This also provides a more efficient use of limited resources effectively providing the system with more capacity.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. A method of conducting handoff of a data transmission in a communication system comprising the steps of:
   handing-off a communication link of a mobile unit from a source base site to a target base site;
   transferring an interworking function from a source interworking unit located at the source base site to a target interworking unit located at the target base site; and
   cutting-over from a source modem to a target modem.

2. The method of claim 1 wherein said step of transferring said interworking function comprises the steps of:
   assigning said target modem;
   transferring a protocol status from said source interworking unit to said target interworking unit; and
   transferring a modem parameter from said source modem to said target modem.

3. The method of claim 2 wherein said step of transferring said interworking function further comprises the step of transferring buffered data from said source interworking unit to said target interworking unit.

4. The method of claim 2 wherein said step of assigning said target modem comprises the step of initializing said target modem.

5. A method of conducting handoff of a data transmission in a communication system comprising the steps of:
   handing-off a communication link of a mobile unit from a digital base site to an analog base site; and
   transferring a modem function from a source interworking unit to said mobile unit.

6. The method of claim 5 wherein said step of transferring said modem function comprises the steps of:
   initializing a mobile unit modem;
   transferring a protocol status from said source interworking unit to said mobile unit modem; and
   transferring a modem parameter from said interworking unit to said mobile unit modem.

7. The method of claim 6 wherein said protocol status is transferred to said mobile unit modem over one of a control channel link and a traffic channel link between said mobile unit and said digital base site.

8. A method of conducting handoff of a data transmission in a communication system comprising the steps of:
   handing-off a communication link of a mobile unit from a digital base site to a analog base site;
   transferring an interworking function from a source interworking unit to a target interworking unit;
   training a wireless modem pair; and
   cutting-over from a source modem to a target modem.

9. The method of claim 8 wherein said step of transferring an interworking function comprises the steps of:
   assigning said target modem;
   transferring a wireline protocol status from said source interworking unit to said target interworking unit; and
   transferring a modem protocol from said source modem to said target modem.

10. The method of claim 8 wherein said step of training said wireless modem pair comprises the steps of:
    training an analog base site wireless modem;
    training a mobile unit wireless modem;
    negotiating a wireless protocol between said analog base site wireless modem and said mobile unit wireless modem; and
    establishing said wireless protocol negotiated between said analog base site wireless modem and said mobile unit wireless modem.

* * * * *